(12) United States Patent
Kim et al.

(10) Patent No.: US 9,919,762 B2
(45) Date of Patent: Mar. 20, 2018

(54) BACKPACK TYPE SELF BALANCING SCOOTER HAVING FOOT-DRIVEN STEERING APPARATUS MOUNTED THEREON

(71) Applicant: ROBO3 Co., Ltd., Seoul (KR)

(72) Inventors: Joon Hyung Kim, Seoul (KR); Gwang Seok Jeon, Seoul (KR)

(73) Assignee: ROBO3 CO., LTD., Seoul (KR)

( * ) Notice: Subject to any disclaimer, the term of this patent is extended or adjusted under 35 U.S.C. 154(b) by 0 days.

(21) Appl. No.: 15/026,389

(22) PCT Filed: Mar. 17, 2014

(86) PCT No.: PCT/KR2014/002206
§ 371 (c)(1),
(2) Date: Mar. 31, 2016

(87) PCT Pub. No.: WO2015/111793
PCT Pub. Date: Jul. 30, 2015

(65) Prior Publication Data
US 2016/0318581 A1    Nov. 3, 2016

(30) Foreign Application Priority Data

Jan. 27, 2014    (KR) .................. 10-2014-0009978

(51) Int. Cl.
*B62D 11/00*    (2006.01)
*B62M 7/12*    (2006.01)
(Continued)

(52) U.S. Cl.
CPC ................ *B62M 7/12* (2013.01); *B60L 11/18* (2013.01); *B62J 1/08* (2013.01); *B62J 25/00* (2013.01);
(Continued)

(58) Field of Classification Search
CPC . B62K 11/007; B62K 17/00; B62J 2099/0053
(Continued)

(56) References Cited

U.S. PATENT DOCUMENTS 4,445,699 A * 5/1984 Darasko ............... A63C 17/045
280/11.223
4,527,983 A * 7/1985 Booth .................. B63H 20/007
114/153

(Continued)

FOREIGN PATENT DOCUMENTS

JP    2005-145296 A    6/2005
JP    2006-315666 A    11/2006
(Continued)

*Primary Examiner* — Joseph M Rocca
*Assistant Examiner* — Conan D Duda
(74) *Attorney, Agent, or Firm* — John K. Park; Park Law Firm (57) ABSTRACT

A backpack type self balancing scooter having a foot-driven steering apparatus mounted thereon is provided, including: two wheels having motors mounted thereon; a motor housing for mounting the motors therein in such a manner as to allow rotary shafts of the motors to be located linearly to each other; a footrest; a shuttle ring mounted on any one side of the footrest; an erecting housing, a controller mounted on the upper portion, a cover disposed coveringly on top thereof, and an insertion hole formed on the center of the cover; a saddle; and a backpack. The rider walks in the state of carrying the backpack on the back, or puts the backpack on the around, sits on the saddle to drive the self balancing scooter in the state where both hands are free, while conducting the direction changes through the shuttle ring turned with his or her foot.

1 Claim, 7 Drawing Sheets (51) Int. Cl.
   *B62K 11/00* (2006.01)
   *B62J 1/08* (2006.01)
   *B62J 25/00* (2006.01)
   *B60L 11/18* (2006.01)
   *B62J 99/00* (2009.01)
(52) U.S. Cl.
   CPC ......... *B62K 11/007* (2016.11); *B60L 2200/16* (2013.01); *B60L 2250/26* (2013.01); *B62J 2099/0053* (2013.01); *B62K 2202/00* (2013.01); *Y02T 10/648* (2013.01); *Y02T 10/7005* (2013.01); *Y02T 10/7258* (2013.01)
(58) Field of Classification Search
   USPC .................................................. 180/6.58, 218
   See application file for complete search history.

(56) References Cited

U.S. PATENT DOCUMENTS

| | | | | |
|---|---|---|---|---|
| 5,236,208 A * | 8/1993 | Welsh | ................ | A63C 17/013 280/11.27 |
| 6,126,497 A * | 10/2000 | Stockton | ................ | B63H 20/007 114/144 A |
| 6,332,565 B1 * | 12/2001 | Tsai | ................ | B62J 99/00 224/257 |
| 7,185,555 B2 * | 3/2007 | Peterson | ................ | G05G 1/30 74/512 |
| 8,606,468 B2 * | 12/2013 | Kosaka | ................ | A63C 17/12 180/219 |
| 8,640,807 B2 * | 2/2014 | Takenaka | ................ | B62K 1/00 180/218 |
| 9,393,483 B2 * | 7/2016 | Tan | ................ | A63C 17/12 |
| 9,598,136 B1 * | 3/2017 | Kim | ................ | B62K 21/00 |
| 9,604,692 B1 * | 3/2017 | Kim | ................ | B62K 23/08 |
| 2001/0032743 A1 * | 10/2001 | Kamen | ................ | A63C 17/12 180/7.1 |
| 2004/0035621 A1 * | 2/2004 | Yu | ................ | B62K 3/002 180/181 |
| 2004/0036247 A1 * | 2/2004 | Lee | ................ | B62K 21/00 280/221 |
| 2006/0086544 A1 * | 4/2006 | Kamen | ................ | B62D 37/00 180/21 |
| 2009/0288900 A1 * | 11/2009 | Takenaka | ................ | B62K 11/007 180/218 |
| 2011/0303475 A1 * | 12/2011 | Kim | ................ | B62K 11/007 180/218 |
| 2012/0286011 A1 * | 11/2012 | Wegener | ................ | A45C 13/02 224/627 |
| 2013/0238231 A1 * | 9/2013 | Chen | ................ | B62K 11/007 701/124 |
| 2013/0248573 A1 * | 9/2013 | Kim | ................ | A45F 4/02 224/576 |
| 2015/0114741 A1 * | 4/2015 | Kawatani | ................ | A61G 3/0209 180/218 |
| 2015/0238845 A1 * | 8/2015 | Clayton | ................ | B62K 3/002 280/87.042 |
| 2015/0298756 A1 * | 10/2015 | Takeda | ................ | B62K 23/08 180/218 |

FOREIGN PATENT DOCUMENTS

| | | |
|---|---|---|
| JP | 2009-120176 A | 6/2009 |
| KR | 10-2002-0065694 A | 8/2002 |
| KR | 10-1079755 B1 | 11/2011 |

* cited by examiner

BACKPACK TYPE SELF BALANCING SCOOTER HAVING FOOT-DRIVEN STEERING APPARATUS MOUNTED THEREON

TECHNICAL FIELD

The present invention relates to a self balancing scooter, and more particularly, to a backpack type self balancing scooter having a foot-driven steering apparatus mounted thereon wherein so as to manipulate left and right direction changes of the self balancing scooter, a rider's foot is stepped on a shuttle ring as the steering apparatus so that the shuttle ring is turned to left and right sides through the compression force applied from the rider's foot, thus making it possible to conduct the left and right direction changes.

BACKGROUND ART

Figure 1:
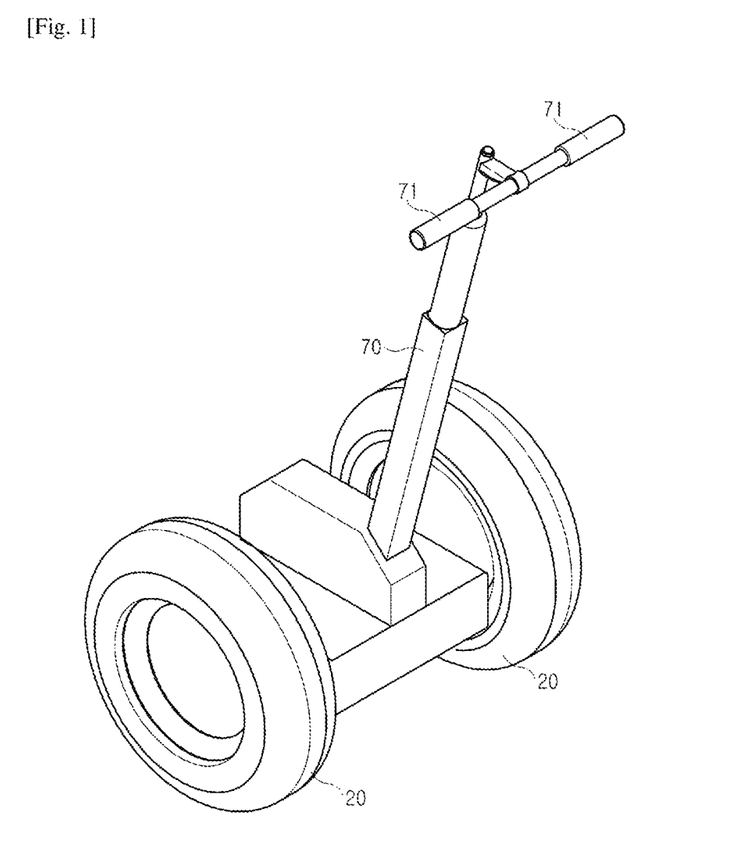
FIG. 1 is a perspective view showing a conventional two-wheel self balancing scooter.

FIG. 1 is a perspective view showing a conventional two-wheel self balancing scooter. As shown in FIG. 1, first, the conventional two-wheel self balancing scooter is driven with the two wheels 20 disposed in left and right sides thereof, while the two wheels 20 are keeping their balance in real time during driving. So as to maintain the balance between the two wheels 20, while various electric processors like a gyro sensor are being controlled under a controller, the speed of the two wheels 20 is regulated in real time according to inclinations of a rider's body, thus conducting forward and backward driving and left and right direction changes.

As shown in FIG. 1, for example, if the rider takes manipulation handles 91 to incline his or her body forwardly to a given angle in the state of riding on the two wheel self balancing scooter, the inclination of the rider's body is in real time read through a controller on which a variety of sensors like a gyro sensor are collected, and the two wheels 20 are driven in the direction of the inclination to offset the inclination, so that the scooter can change the position, while being not overturned forwardly due to the generation of the inclination, thus achieving safe driving.

Accordingly, the self balancing scooter can maintain its erecting state with the two wheels, without losing its balance, and it can be driven forwardly and backwardly according to the inclination directions of his or her body. Further, as the manipulation handles 91 located on the left and right sides of the self balancing scooter are turned appropriately, the direction changes of the scooter can be achieved.

According to the conventional two-wheel self balancing scooter, however, the rider takes the manipulation handles 91 and rides on the scooter in the state of standing upright, so that, unfortunately, his or her hands are not freely used during driving. On the other hand, as shown in FIG. 1, a fixing shaft 90 is straightly disposed on the two-wheel self balancing scooter, and the manipulation handles 91 are mounted on the upper portion of the fixing shaft 90, so that the whole volume of the two-wheel self balancing scooter can be bulky, thus making it hard to be kept in the trunk of a vehicle to cause many difficulties in the transportation and storage thereof.

DISCLOSURE

Technical Problem

Accordingly, the present invention has been made in view of the above-mentioned problems occurring in the prior art, and it is an object of the present invention to provide a backpack type self balancing scooter having a foot-driven steering apparatus mounted thereon that is capable of allowing a rider's both hands to be freely used while driven, so that since there are no conventional manipulation handles for conducting direction changes, a dialing type shuttle ring is turned through the pressure applied from the rider's foot sole stepped on a footrest, thus making it possible to conduct the left and right direction changes.

It is another object of the present invention to provide a backpack type self balancing scooter having a foot-driven steering apparatus mounted thereon that is configured to have a shape of a backpack capable of being used even on a place where it is hard to drive wheels or where driving is not admitted, so that a rider walks in the state where the backpack carries on his or her back, and if necessary, he or she puts the backpack on the ground, steps his or her feet on a footrest, and sits on a saddle to drive the scooter.

Technical Solution

To accomplish the above-mentioned objects, according to the present invention, there is provided a backpack type self balancing scooter having a foot-driven steering apparatus mounted thereon, the backpack type self balancing scooter including: two wheels having motors mounted thereon; a motor housing for mounting the motors therein in such a manner as to allow rotary shafts of the motors to be located linearly to each other; a footrest disposed on top of the motor housing to place a rider's feet thereon; a shuttle ring mounted on any one side of the footrest in such a manner as to be rotatingly operated in a dialing way; an erecting housing located on top of the footrest and having a battery mounted therein, a controller mounted on the upper portion thereof to control driving and direction changes, and a cover disposed coveringly on top thereof and having an insertion hole formed on the center thereof; a saddle fitted to the insertion hole formed on the center of the cover; and a backpack mounted surroundingly on the erecting housing, wherein the rider walks in the state of carrying the backpack on his or her back, or he or she puts the backpack on the ground, sits on the saddle to drive the self balancing scooter in the state where his or her both hands are free, while conducting the direction changes through the shuttle ring turned with his or her foot.

Advantageous Effects

According to the present invention, the backpack type self balancing scooter having a foot-driven steering apparatus mounted thereon according to the present invention is configured wherein the dialing type shuttle ring is manipulated through a rider's foot to conduct direction changes, while the rider's hands are not being used, thus allowing his or her both hands to be freely used during driving, so that he or she can take photos, hold objects, or do something.

Further, the backpack type self balancing scooter having a foot-driven steering apparatus mounted thereon according to the present invention is configured wherein even if the rider has disabilities in hands, he or she can drive the scooter only with the inclination of his or her body, and further, his or her foot is turned to the left and right sides to manipulate the shuttle ring, so that the self balancing scooter can be driven easily even by the rider with disabilities in hands.

Furthermore, the backpack type self balancing scooter having a foot-driven steering apparatus mounted thereon according to the present invention is configured wherein unlike the conventional practice in which the manipulation handles controlling direction changes are mounted on top of the fixing shaft, there are no fixing shaft and the manipulation handles, thus allowing the whole volume of the scooter to be reduced, so that the scooter can be kept easily in the trunk of a vehicle, thus making it simple in the transportation and storage thereof.

On the other hand, the backpack type self balancing scooter having a foot-driven steering apparatus mounted thereon according to the present invention is configured to have a shape of a backpack in which the rider's personnel objects and scooter are all contained, so that during he or she moves to his or her destination in the state of carrying the backpack on his or her back, he or she puts the backpack on the ground, steps on the footrest, sits on the saddle, and inclines his or her body to drive his or her scooter on a place where driving is convenient, but on stairs or sharp slopes on which driving is hard or on subway or bus boarding, he or she carries the backpack on his or her back again, thus allowing the individual's objects and scooter to be transported and stored in a very convenient way.

EXPLANATION ON THE REFERENCE NUMERALS IN THE DRAWINGS

10: motor housing
20: wheel
21: motor
30: footrest
40: shuttle ring
50: erecting housing
51: battery
52: controller
53: cover
54: insertion hole
60: saddle
70: fixing shaft
71: manipulation handle
80: backpack

MODE FOR INVENTION

Hereinafter, an explanation on a backpack type self balancing scooter having a foot-driven steering apparatus mounted thereon according to the present invention will be in detail given with reference to the attached drawing.

According to the present invention, a backpack type self balancing scooter having a foot-driven steering apparatus mounted thereon is characterized in that a dialing type shuttle ring on which a rider's foot is stepped is turned to conduct the direction changes of the scooter, so that his or her both hands are freely used while the scooter is being driven. While the backpack type self balancing scooter is being not driven, it can be carried on his or her back, thus optimizing the conveniences in the transportation and storage thereof.

Figure 2:
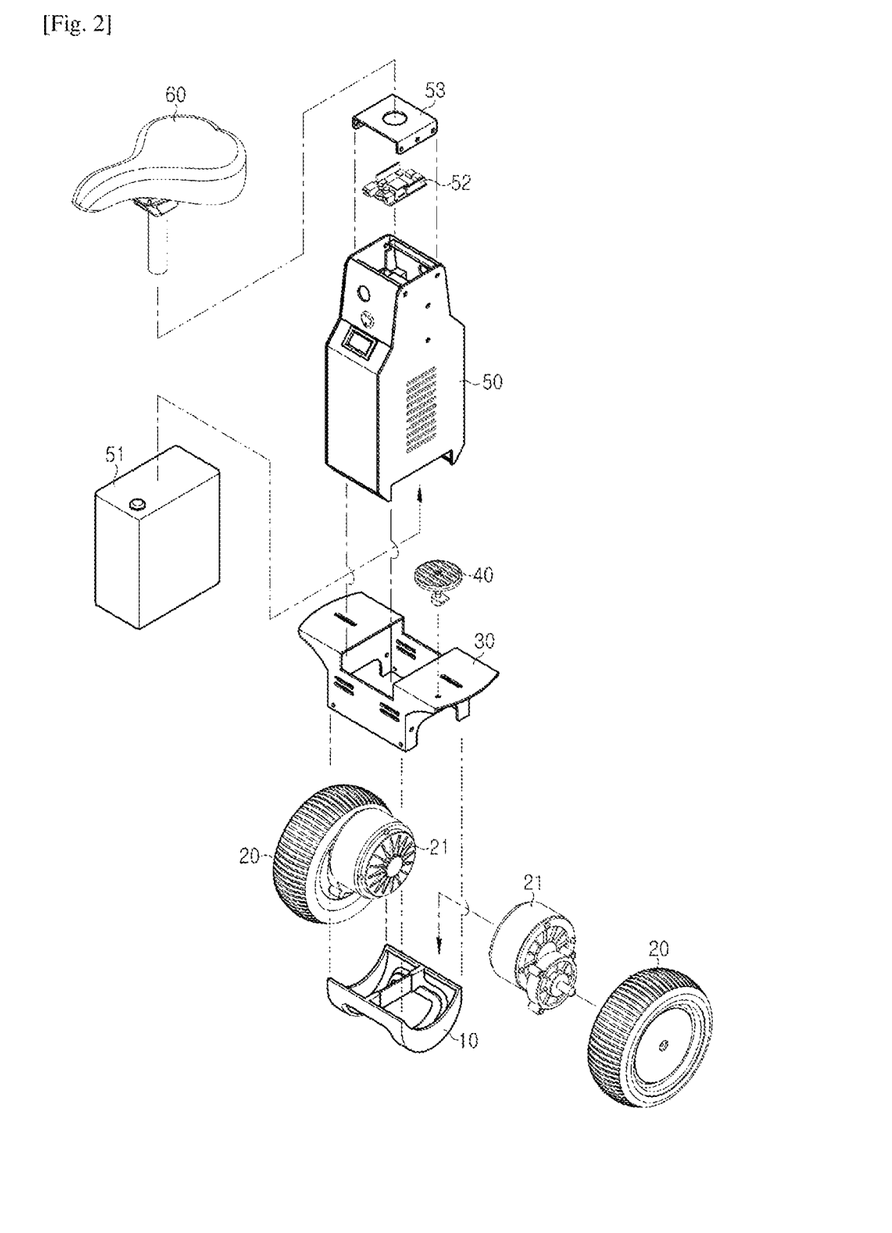
FIG. 2 is an exploded perspective view showing a backpack type self balancing scooter having a foot-driven steering apparatus mounted thereon according to the present invention.
Figure 3:
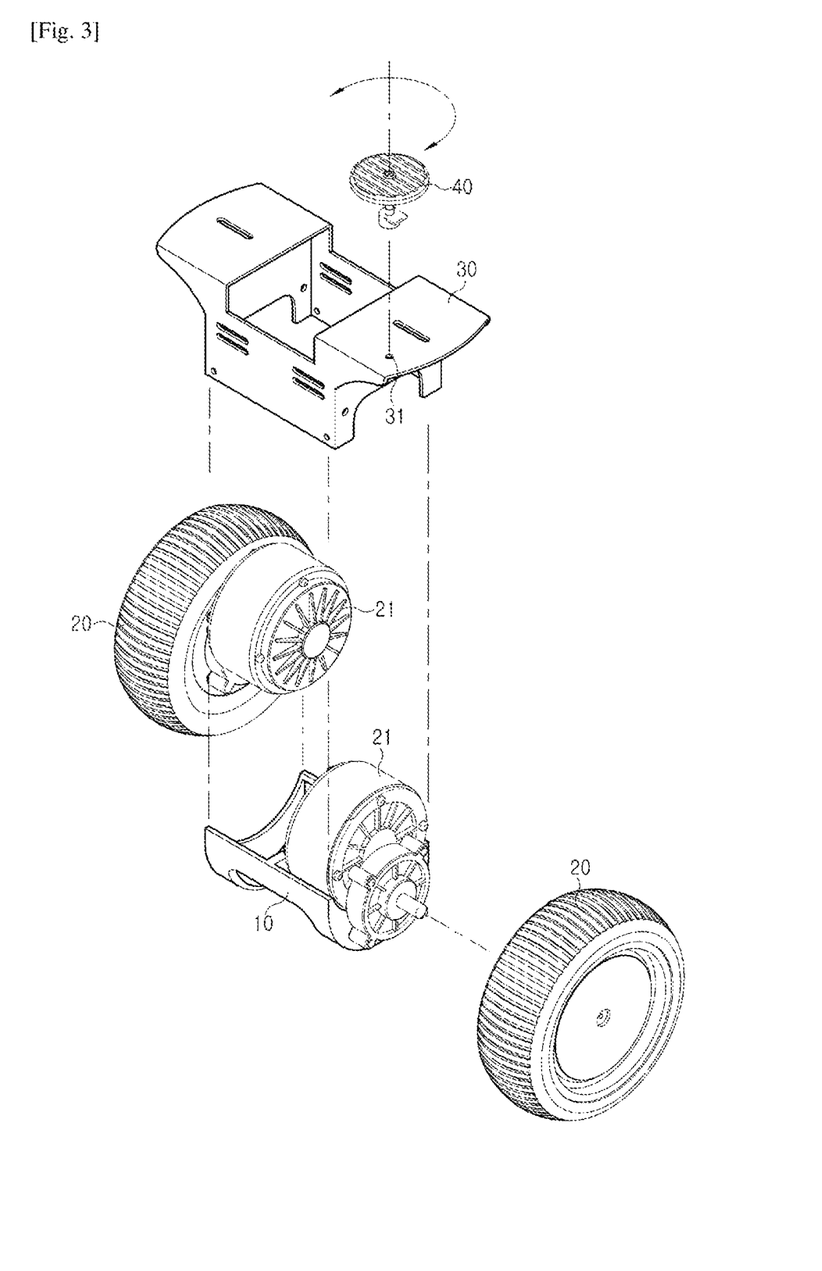
FIGS. 3 and 4 are perspective views showing a motor housing and a footrest of the backpack type self balancing scooter according to the present invention.
Figure 4:
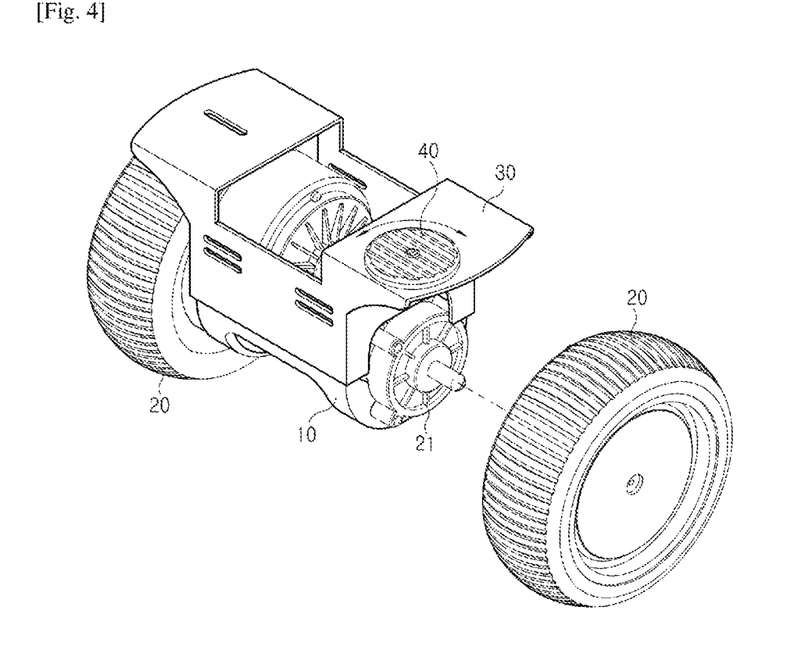

FIG. 2 is an exploded perspective view showing a backpack type self balancing scooter having a foot-driven steering apparatus mounted thereon according to the present invention, and FIGS. 3 and 4 are perspective views showing a motor housing and a footrest of the backpack type self balancing scooter according to the present invention. As shown in FIGS. 2 and 3, a backpack type self balancing scooter having a foot-driven steering apparatus mounted thereon according to the present invention has two motors 21, two wheels 20 mounted on the shafts of the motors 21, and a motor housing 10 for mounting the two motors 21 therein in such a manner as to allow rotary shafts of the motors 21 to be located linearly to each other.

Further, a footrest 30 is disposed on top of the motor housing 10 to place a rider's feet thereon. The footrest 30 desirably includes concave and convex portions or a non-slip material formed thereon to generate a frictional force from the soles of the rider's feet, so that he or she can take a stable posture.

On the other hand, the footrest 30 has a mounting hole 31 formed on any one side thereof to mount a shuttle ring 40 as will be discussed later thereon in such a manner as to be rotatingly operated in a dialing way. The mounting hole 31 on which the shuttle ring 40 is mounted is desirably formed at a position where the rider's foot is naturally placed on the top of the mounting hole 31 in the state where his or her feet are open at a shoulder width.

The shuttle ring 40 is turned to left and right sides to manipulate the direction changes of the self balancing scooter according to the present invention. That is, the shuttle ring 40 is turned through the compression force applied from the rider's foot stepped thereon to conduct left turning or right turning, and if the direction change is finished, the application of the compression force is naturally released to automatically return the turned shuttle ring 40 to its original position. FIG. 4 is a perspective view showing the motor housing 10, the motors 21, the wheels 20, the footrest 30 and the shuttle ring 40 mounted on the self balancing scooter according to the present invention.

Figure 5:
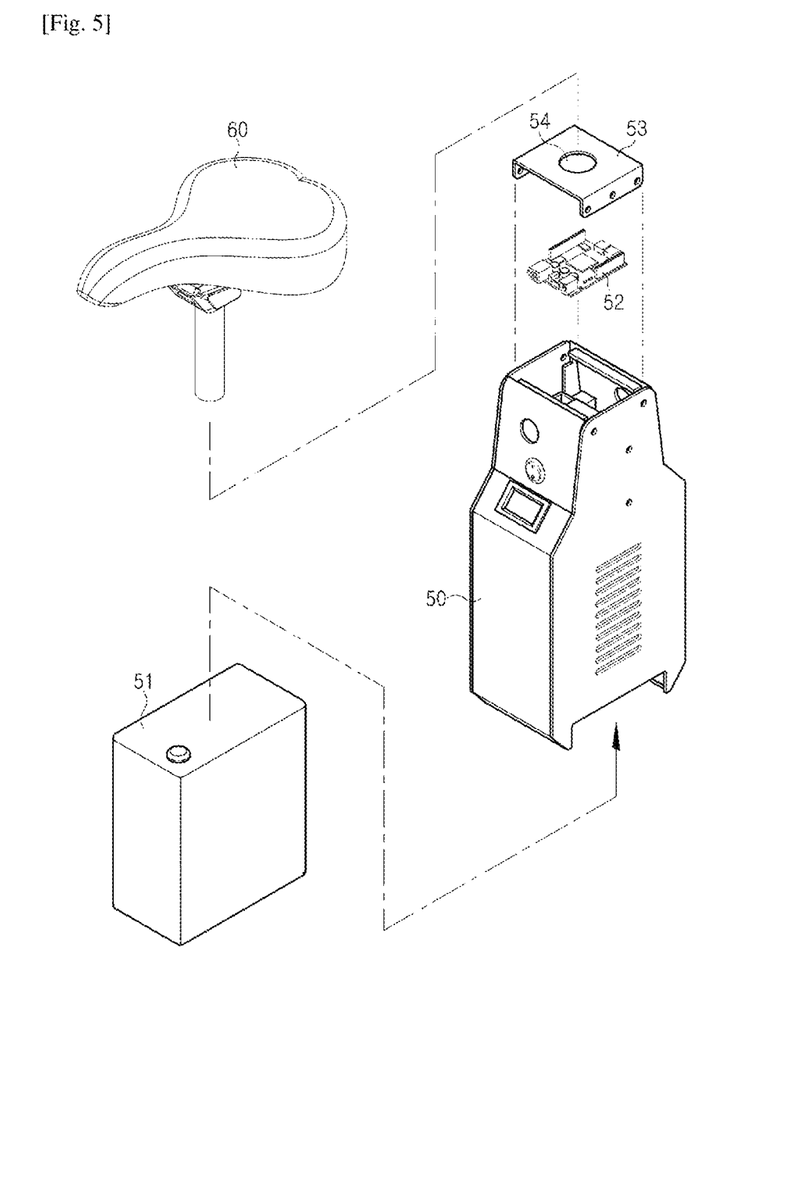
FIG. 5 is a perspective view showing an erecting housing of the backpack type self balancing scooter according to the present invention.

FIG. 5 is a perspective view showing an erecting housing of the backpack type self balancing scooter according to the present invention. As shown in FIGS. 1 and 5, an erecting housing 50 is located on top of the footrest 30 and has a battery 51 mounted therein to drive the motors 21. Further, the erecting housing 50 has a power applying switch, a plug for charging the battery 51, and a display for displaying the driving state, the rest amount of the battery 51 and malfunctions, mounted on one side surface thereof.

On the other hand, as shown in FIG. 5, the erecting housing 50 has a controller 52 mounted on the upper portion thereof, on which a variety of sensors like a gyro sensor are collected, to control driving and direction changes of the self balancing scooter, and a cover 53 disposed coveringly on top thereof. A saddle 60 whose height is adjustable is insertedly fitted to an insertion hole 54 formed on the center of the cover 53.

Figure 6:
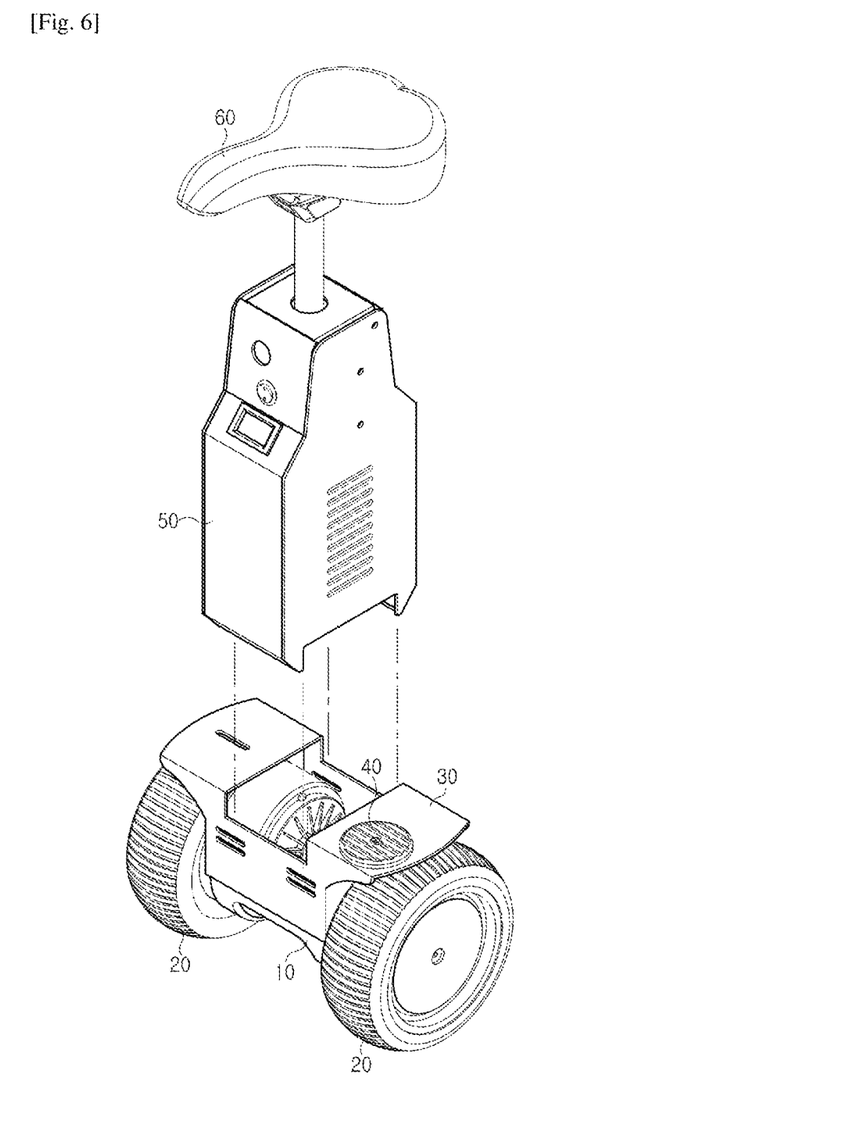
FIG. 6 is a perspective view showing a partially coupled state of the backpack type self balancing scooter according to the present invention.

FIG. 6 is a perspective view showing a partially coupled state of the backpack type self balancing scooter according to the present invention. As shown in FIG. 6, if the erecting housing 50 is mounted on top of the footrest 30, the rider's feet are placed on the footrest 30 in the state where he or she sits on the saddle 60, and his or her body is inclined forwardly or backwardly to drive the scooter, while his or her both hands are being freely used.

As described above, the backpack type self balancing scooter according to the present invention is configured wherein the shuttle ring 40 on which the rider's foot is stepped is compressed and rotated to a left or right side to conduct the direction change of the scooter while driven, so that the direction change signal of the shuttle ring 40 is transmitted along an electric wire to the controller 52 mounted in the erecting housing 50, thus allowing the self balancing scooter to be changed in direction.

Figure 7:
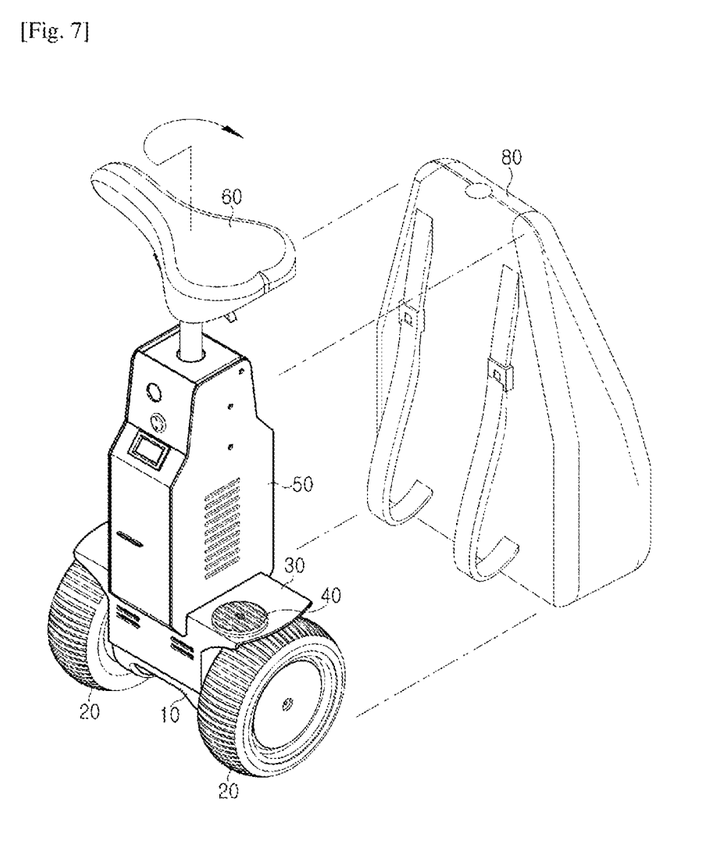
FIG. 7 is a perspective view showing the use state of the backpack type self balancing scooter according to the present invention.

FIG. 7 is a perspective view showing the use state of the backpack type self balancing scooter according to the present invention. As shown in FIG. 7, a backpack 80 is mounted surroundingly on the erecting housing 50, thus completely providing the backpack type self balancing scooter according to the present invention. On the other hand, the saddle 60 may press upon the rider's head when the self balancing scooter according to the present invention is carried to the shape of the backpack 80 on his or her back, and therefore, the saddle 60 is desirably turned in the direction of an arrow as shown in FIG. 7.

Accordingly, the backpack type self balancing scooter having a foot-driven steering apparatus mounted thereon according to the present invention is capable of providing an individual's personnel transportation means, thus giving many conveniences in the transportation and storage to the individual. That is, during the rider moves to his or her destination in the state of carrying the backpack 80 on his or her back, he or she puts the backpack 80 on the ground, steps on the footrest 30, sits on the saddle 60, and inclines his or her body to drive his or her scooter on a place where driving is convenient, but on stairs or sharp slopes on which driving is hard or on subway or bus boarding, he or she carries the backpack 80 on his or her back again, thus allowing the individual's objects and scooter to be transported and stored in a very convenient way.

Further, the backpack type self balancing scooter according to the present invention is capable of allowing the rider's both hands to be freely used in the state of riding thereon. Accordingly, his or her both hands are freely used so that during driving, he or she can take photos, hold objects, or do something. On the other hand, even if the rider has disabilities in hands, he or she can drive the scooter with the manipulation of the shuttle ring 40 through his or her foot, so that the self balancing scooter can be foot-driven easily.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

The invention claimed is:

1. A self balancing scooter having a foot-driven steering apparatus mounted thereon, comprising:
   two wheels 20 having motors 21 mounted thereon;
   a motor housing 10 for mounting the motors 21 therein in such a manner as to allow rotary shafts of the motors 21 to be located linearly to each other;
   a footrest 30 disposed on top of the motor housing 10 to place a rider's feet thereon;
   a shuttle ring 40 mounted on any one side of the footrest 30 in such a manner as to be rotatingly operated in a dialing way;
   an erecting housing 50 located on top of the footrest 30 and having a battery 51 mounted therein, a controller 52 mounted on an upper portion thereof to control driving and direction changes, a cover 53 disposed coveringly on top thereof, and an insertion hole 54 formed on the center of the cover 53;
   a saddle 60 fitted to the insertion hole 54 of the cover 53; and
   a backpack 80 mounted surroundingly on the erecting housing 50,
   wherein the self balancing scooter is configured so that the rider walks carrying the backpack 80 on a back of the rider, or the rider puts the backpack 80 on a ground, or the rider sits on the saddle 60 to drive the self balancing scooter with both hands free and changes the direction through the shuttle ring 40 turned with a foot of the rider,
   wherein the saddle 60 is configured to be turned sideways, so as to prevent the saddle 60 from pressing upon the rider's head when the self balancing scooter is carried with the backpack 80 on the rider's back.

\* \* \* \* \*